(12) United States Patent
Wong

(10) Patent No.: US 7,146,459 B2
(45) Date of Patent: Dec. 5, 2006

(54) WRITING A SEQUENCE OF M BYTES TO A DISK WITH CONTINUOUS WRITE STEPS ALIGNED ON 8 BYTE BOUNDARIES

(75) Inventor: Kelvin Wong, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 10/912,461

(22) Filed: Aug. 4, 2004

(65) Prior Publication Data
US 2005/0044279 A1 Feb. 24, 2005

(30) Foreign Application Priority Data
Aug. 14, 2003 (GB) .................... 0319081.6

(51) Int. Cl.
*G06F 13/12* (2006.01)
(52) U.S. Cl. ..................... 711/112
(58) Field of Classification Search ............... 711/112
See application file for complete search history.

(56) References Cited
U.S. PATENT DOCUMENTS

| | | | |
|---|---|---|---|
| 5,652,857 A | * | 7/1997 | Shimoi et al. ............. 711/113 |
| 5,724,542 A | * | 3/1998 | Taroda et al. ............. 711/113 |
| 5,802,557 A | * | 9/1998 | Vishlitzky et al. ......... 711/112 |
| 6,546,447 B1 | | 4/2003 | Buckland et al. .......... 710/306 |

* cited by examiner

*Primary Examiner*—David L. Robertson
*Assistant Examiner*—Hamdy Ahmed
(74) *Attorney, Agent, or Firm*—William D. Gill

(57) ABSTRACT

A method of writing data to a disk, said method performing a write-modify-read for every partial 8 byte write, said method comprising: receiving a request for a sequence of L bytes; determining whether the last byte of the sequence of L bytes is last byte of an 8 byte boundary in a sector of the disk; modifying, if the last byte of the sequence of L bytes is not the last byte of an 8 byte boundary in a sector of the disk, the number of bytes L by an amount of bytes that would allow the last byte of reduced request to be the last byte of an 8 byte boundary in a sector of the disk, said modified number of bytes represented by M; requesting a sequence of M bytes receiving the sequence of M bytes; writing the sequence of M bytes to one or more disk sectors with continuous write steps whereby the sequence of M bytes does not need a partial 8 byte write and there is no read-modify-write step.

8 Claims, 7 Drawing Sheets

WRITING A SEQUENCE OF M BYTES TO A DISK WITH CONTINUOUS WRITE STEPS ALIGNED ON 8 BYTE BOUNDARIES

FIELD OF INVENTION

This invention relates to a method and apparatus for writing data to a disk. In particular it relates to a writing data to disks arranged into sectors of 524 bytes where an error correcting code is used to monitor the data transfer.

BACKGROUND OF THE INVENTION

The PCI-X (peripheral components interface X) bus addendum is an extension of PCI bus specification. It is a data transfer protocol commonly used in high-end storage servers to transfer data to and from microprocessor and peripherals. The peripheral the subject of this publication is a disk adapter card attached to disk storage. PCI-X then is compatible with the PCI 64 bit 66 Mhz spec but also is able to handle much higher clock rate of 133, 266 and 533 providing a peak bandwidth of 4.3 Gbytes per second. A typical transfer size is 4 Kbytes of data at a rate of up to 100 times a second. The PCI-X card form-factor; pin-outs; connector; bus widths; and protocols are the same as their equivalents in the PCI specification.

The basic architecture in which a storage server connects to a PCI-X bus and system memory via a disk adapter card bus is shown in FIG. 1. The disk adapter card is an intermediary between server memory and attached disk storage, allowing data transfer between the two.

A schematic diagram of the disk adapter card is shown in FIG. 2. The disk adapter card contains a PCI-X interface device; SDRAM DIMM buffer memory; disk interface devices and an SDRAM Bus Arbiter. The disk interface device uses any standard protocol such as Fibre channel, SSA or SCSI. The buffer memory is typically SDRAM DIMM technology as this provides a suitably fast, inexpensive and dense medium for such adapter applications. The SDRAM can be accessed by: a single PCI-X interface device allowing data transfer between the PCI-X bus and the SDRAM; or one or more devices allowing the transfer of data between SDRAM and disk storage. Each device can connect to its own separate cluster of storage using the chosen disk interface protocol.

The SDRAM bus arbiter device decides which of the disk interface devices may access the SDRAM at any one time. Note that in some adapter designs, one or more of the disk interface devices may be amalgamated into one disk interface device chip but for the purposes of describing the embodiment they are shown separated.

The function of the SDRAM is to act as a buffer to compensate for any data transfer speed differentials between the PCI-X bus and the disk interface protocol. A typical DIMM bus width is 8 bytes and hence data is organised and addressed as 8-byte "words".

A problem with the data write to disk is caused by the generation of an error-correcting code or ECC for each 8-byte word written into SDRAM. The ECC acts to provide some data error detection and correction for the data write, it is generated using the entire 8-byte word. Whenever a complete 8-byte word is to be written, a new ECC is generated from it. However, if only a part of the 8-byte word is to be written, the PCI-X device performing the buffer write must do the following: read in the entire word; modify the bytes that are to be updated with their new values; regenerate the ECC over the entire word and finally; and write the word back to SDRAM.

Such an operation is commonly known as a Read-Modify-Write. It is necessary because an ECC needs to be generated for a whole word corresponding to that stored in the SDRAM rather than just a part of word written to the SDRAM. This is not an issue when a full word is being written to the SDRAM but only when a partial word is to be written. Therefore it is necessary to acquire the whole word from SDRAM after a partial word is written.

One reason for partial word writes to occur is when the number of bytes stored in a sector of a disk is not a multiple of 8 bytes. Each sector will contain a certain sized payload of data, typically 512 or 524 bytes. This embodiment relates to sectors with 524 payloads which are not multiples of 8 bytes. Each payload may include further data checking meta data such as LRC (Longitudinal Redundancy Checking), CRC (Cyclic Redundancy Checking) or a sequence number that increments with every sector transferred. This meta data is related to the data itself as distinct from the ECC which is related to the checking of the transfer of data from the PCI-X bus to the disk. SDRAM data is organised on 8-byte address boundaries and each sector on the disk is stored on an 8-byte boundary so that it is easily addressable by each of the disk interface devices on the disk adapter card. Therefore to every 524 byte sector stored in SDRAM a pad of 4 bytes (see FIG. 5A) is added by the disk interface device which is storing the data (whether it be the PCI-X device or one of the disk interface devices), so that the following sector is also stored on an 8-byte boundary. Moreover, as each sector with padding is physically 528 bytes in size, each sector can be stored at a 528-byte aligned boundary.

U.S. Pat. No. 6,546,447 (Buckland) discloses a method and apparatus for dynamic PCI combining for PCI bridges. Buckland deals with preventing a memory controller from performing read-modify-writes (RMWs) where the data is being written from the PCI adapter to the system memory. Such RMWs can result in performance degradation when data is being transferred from system memory. Data in system memory is organised as a contiguous block of data. The PCI bridge in Buckland, acting as a target on the PCI bus, takes separate write bursts destined for contiguous addresses in system memory and buffers them together. When it has enough data to fill an integer number of cache lines of system memory it sends the data out in one burst to prevent the read-modify-write.

However Buckland only deals with the case where the PCI adapter is writing data to the system memory. It does not deal with the case where data is read from system memory, for example, by a PCI adapter and transferred into a local buffer on the adapter. Also, in Buckland, system memory is organised as a contiguous block of data so it does not need to take sector organisation into account and it does not need to deal with the case where data in system memory is organised differently from how it is organised in the local buffer.

DISCLOSURE OF THE INVENTION

According to a first aspect of the present invention there is provided a method of writing data to a disk, said method performing a write-modify-read for every partial 8 byte write, said method comprising: receiving a request for a sequence of L bytes; determining whether the last byte of the sequence of L bytes is last byte of an 8 byte boundary in a sector of the disk; modifying, if the last byte of the sequence of L bytes is not the last byte of an 8 byte boundary in a sector of the disk, the number of bytes L by an amount of bytes that would allow the last byte of reduced request to be the last byte of an 8 byte boundary in a sector of the disk, said modified number of bytes represented by M; requesting a sequence of M bytes; receiving the sequence of M bytes; and writing the sequence of M bytes to one or more disk sectors with continuous write steps whereby the sequence of M bytes does not need a partial 8 byte write and there is no read-modify-write step.

Writing part of an 8-byte SDRAM word is slower than writing the entire word all in one go because of the extra read operation. Therefore data transfer into SDRAM would be faster if read-modify-writes could be avoided.

The method preferably further comprises calculating an error correcting code for every 8 bytes written; and writing the sequence of M bytes including the error correcting code to one or more disk sectors in a single step with no read modify write step.

The method also may comprise taking into account an initial offset into a disk sector where the bytes are to be written.

One objective of the embodiment of the invention is to improve the throughput when PCI-X adapters are performing disk write operations with 524-byte sectors. In such transfers: data is requested from the server memory by the PCI-X interface device; the data is then stored in SDRAM; the date is then later read out of SDRAM and written out onto disk by the disk interface devices. In the PCI-X protocol, the PCI-X interface device may ask for a maximum of 4096 bytes in any one request. This is the equivalent of seven whole 524-byte sectors plus 428 bytes (see FIG. 5B). To gain the highest performance, the PCI-X controller will provide the data in a single 4096 byte burst. As the PCI-X interface device receives data from the PCI-X bus, it will structure the data by adding a four byte pad of zeros for every whole 524-byte sector chunk before sending it onto SDRAM. Thus the total amount of data transferred to SDRAM is 4124 bytes (a total of seven 4-byte pads must be added to the original 4096 bytes of host data since seven whole sectors are being transferred). Burst writes on the SDRAM bus are the most efficient way for data to be transferred to SDRAM. This is because for each data phase of the burst, a complete 8-byte word is written. No partial words are written which would require a slower read-modify-write operation. If the amount of data to be transferred is a multiple of the SDRAM bus width, then all the data can be written in a single burst. However, as 4124 is not a multiple of 8, the PCI-X device can only write the first 4120 bytes in a single burst and must then perform a read-modify-write operation to write the final 4 bytes. In the meantime, the PCI-X device may have followed up its first 4096-byte host PCI-X read request with a second one and received all the data for that request. It would then be ready to transfer this to SDRAM in the form of another burst. However, the start of this burst will be delayed due to the PCI-X device having to perform the read-modify-write operation in order to complete the transfer of the first 4096-byte block.

Once the first 4096 bytes have been written into SDRAM with the appropriate number of 4-byte pads, seven sectors will have been written as well as 428 bytes of the eighth sector (as mentioned above); see FIG. 5b. Suppose now, the second 4096 bytes requested by the PCI-X device was part of the same disk write operation as the first request and that this second set of 4096 bytes is to be appended, in SDRAM, after the first set. Thus after the second lot of 4096 bytes have been padded and transferred, the transfer will end with a total of fifteen sectors having been written as well 332 bytes of the sixteenth sector (see FIG. 6). Again, the transfer has not ended on an 8-byte aligned boundary. Again a read-modify-write operation is needed which will potentially delay the start of a third burst write by the PCI-X interface device.

In existing implementations, this sequence of 4096-byte read requests and SDRAM writes would continue. For every one hundred and thirty-one 4096-byte blocks transferred in this way to SDRAM (equivalent to one thousand and twenty-one whole 524-byte sectors), sixty-six transfers will require a read-modify-write operation by the PCI-X device. The cumulative delays caused by these read-modify-writes will slow down the overall transfer rate from host to adapter and consequently the overall throughput from host memory to disk.

This method would preferably be implemented in the adapter's PCI-X interface device. For each PCI-X read request, the PCI interface device calculates the largest number of bytes that can be requested from the PCI-X bus (up to and including a maximum of 4096) and written to SDRAM such that the SDRAM transfer will finish on an 8-byte aligned boundary once the addition of appropriate 4-byte pads has been taken into account.

For example, suppose a request to read a block of data from the PCI-X bus (so that it could be written to SDRAM starting at a 528-byte aligned address) were made from the PCI-X interface device to the PCI-X controller. As mentioned above, if 4096 bytes were requested from the PCI-X controller, a total of 4124 bytes would be written to SDRAM. The final four bytes of this would be transferred using a read-modify-write. The PCI-X interface device of the present embodiment of the invention determines that by reducing the amount of data requested by four bytes i.e. to 4092, then 4120 bytes would have to be written to SDRAM (taking into account the 4-byte pads), which would mean no read-modify-write would be necessary (4120 is a multiple of 8).

The method may also comprise taking into account padding bytes at the end of each sector.

The advantage of transferring this modified amount of data is that the entire transfer to SDRAM (for that one read request) can be accomplished in one continuous write burst and without the need for an extra, time-consuming read-modify-write operation. The removal of the need for read-modify-write means that following SDRAM write bursts (pending in the PCI-X device) are not delayed. In addition, the embodiment of the invention calculates an amount of data as close to the allowable PCI-X maximum as possible, so that the largest amount of data can still be burst across the PCI-X bus in one transfer. This maintains high performance on the PCI-X bus.

BRIEF DESCRIPTION OF THE DRAWINGS

In order to promote a fuller understanding of this and other aspects of the present invention, an embodiment of the invention will now be described, by means of example only, with reference to the accompanying drawings in which.

DESCRIPTION OF THE PREFERRED EMBODIMENTS

Figure 1:
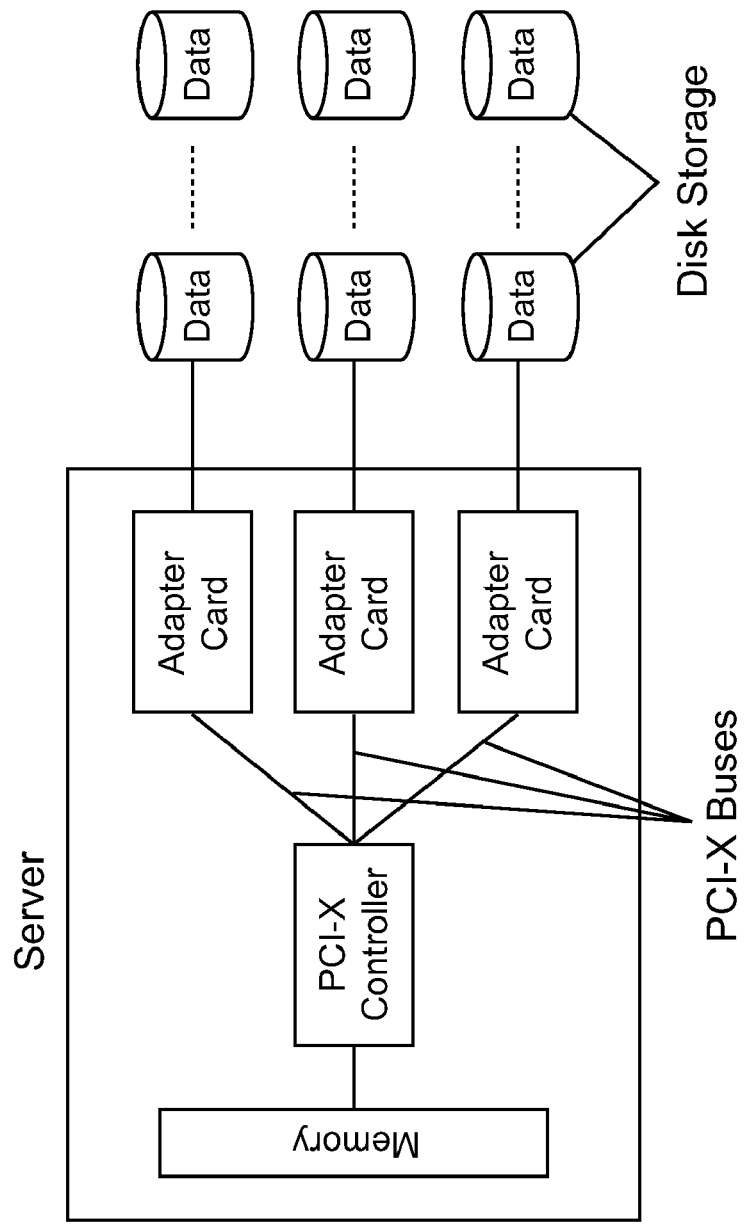
FIG. 1 is schematic diagram of server storage architecture including a disk adapter card.
Figure 2:
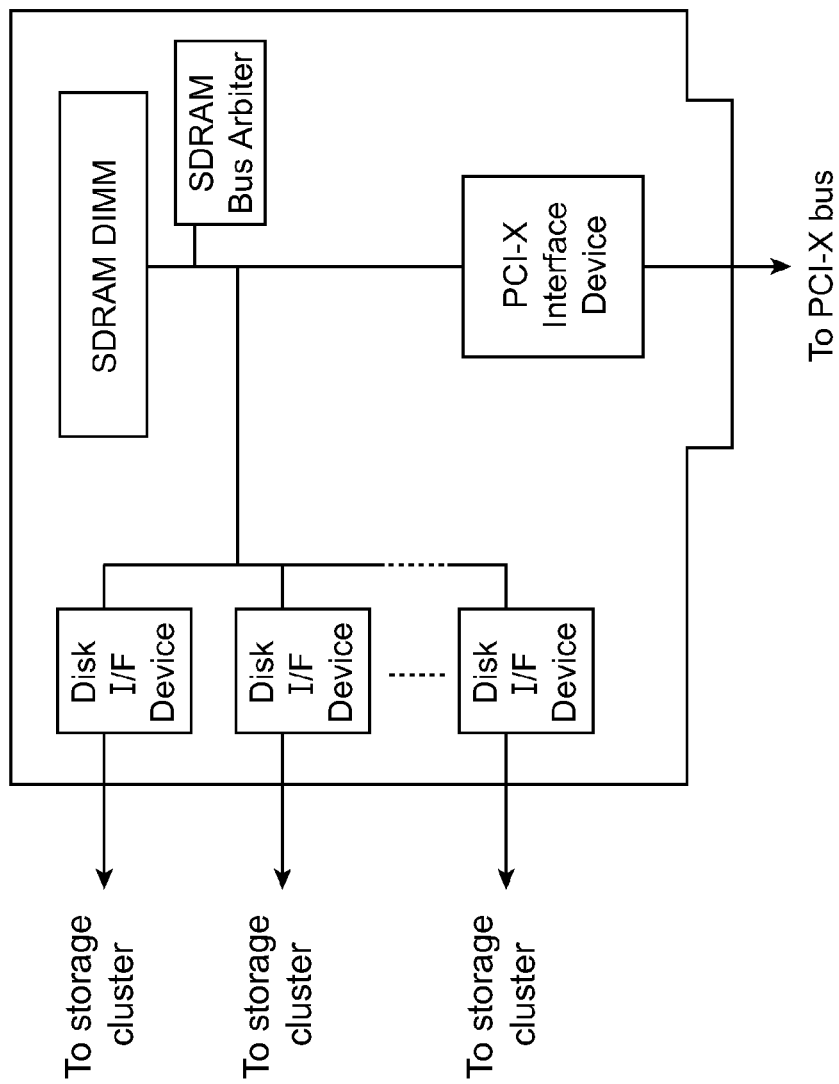
FIG. 2 is a schematic diagram of the disk adapter card including a PCI-X interface device.

The logic of PCI-X interface is described below in terms of equations 1 to 9.

Variable x is the byte offset from the beginning of a sector from which the SDRAM write will take place. A sector payload is 524 read bytes with 4 pad bytes and 0<=x<524. An SDRAM write cannot start from within the pad bytes of a sector.

L is the amount of data left to transfer from the PCI-X bus in a particular disk write operation. If L is less than or equal to 4096, then the PCI-X interface device simply requests L bytes from the host. As this is the final read request for the entire disk write operation, a read-modify-write may be unavoidable in any event.

However, if L>4096, then the invention attempts to finish the SDRAM write on an 8-byte aligned boundary to avoid having to do a read-modify-write. Given the value of x, the embodiment calculates what the final byte offset, y, into the last sector would be at the end of the SDRAM write if 4096 bytes were requested (see FIG. 5A).

$$4096 \text{ bytes} = 7 \text{ sectors} + 428 \text{ bytes} \qquad \text{Equ. 1}$$

If x<96(=524−428), then the SDRAM write will cross seven sector boundaries and therefore seven 4-byte pads will need to be added. Therefore a total of 4124 bytes need to be transferred. The final byte offset, y will be the integer remainder when (x+4124) is divided by 528:

$$y=(x+4124) \% 528 \qquad \text{Equ. 2}$$

Where the function % in the expression a % b is defined as the integer remainder left when a is divided by b. The invention then calculates how far y is from the nearest lower 8-byte aligned boundary. Let this value be z.

$$z=y \% 8 \qquad \text{Equ. 3}$$

If a count of 4096-z bytes is requested from the PCI-X bus, rather than a count of 4096, then the SDRAM write transfer will finish on an 8-byte aligned boundary and a read-modify-write will be avoided.

For the case where x>=96 (FIG. 5b), then the SDRAM write will cross eight sector boundaries and therefore eight 4-byte pads will need to be added. Therefore, a total of 4128 bytes need to be transferred. The expression for y becomes, $$y=(x+4128) \% 528 \qquad \text{Equ. 4}$$

Again applying Equ. 3 to get z and subtracting this from 4096 gives the amount of data that should be requested from the PCI-X bus to avoid a read-modify-write at the end of the SDRAM write.

As 528 is a multiple of 8 and since 4124% 8=4, Equations 2 and 3 can be simplified and merged to give, $$z=(x+4) \% 8, \text{ when } x<96 \qquad \text{Equ. 5}$$

Similarly, Equations 4 and 3 can be simplified to $$z=x \% 8, \text{ when } x>=96 \qquad \text{Equ. 6}$$

$$R=4096-(x+4) \% 8 \text{ when } x<96 \qquad \text{Equ. 7A}$$

$$R=4096-x \% 8 \text{ when } x>=96 \qquad \text{Equ. 7B}$$

Where R is the number of bytes for transfer modified in the light of the offset x.

After R=4096−z bytes have been transferred to disk, the remaining length of the disk write operation, L, gets updated, as does the value of x:

$$L=L-R \qquad \text{Equ. 8}$$

$$x=y \qquad \text{Equ. 9}$$

The invention can now be iteratively re-used with updated values of L and x, until the entire disk write operation is completed i.e. L=0.

The binary value of the starting byte offset, x, is compared with the binary representation of 96 (decimal). The result of this comparison causes one of two values to be multiplexed into the input of a subtractor. If x>=96, then x % 8 is the value chosen. This is simply the three least significant bits of x. If x<96, then the three least significant bits of x are added to the binary representation of 4 (decimal). The carry of this addition is ignored and the three bit sum is chosen as the value input into the subtractor (310), as it represents the value from Equation 5.

The value chosen to be multiplexed into the subtractor is subtracted from the binary representation of 4096 (decimal). Note that the output of the multiplexor is a three bit value which must be padded with ten zeros on the left, on its way to the subtractor, to form a thirteen bit value to match the length of the binary representation of 4096. The output of the subtractor becomes the modified read count to be requested on the PCI-X bus. Using this modified read count will avoid a read-modify-write on the subsequent write of data into SDRAM.

Figure 3:
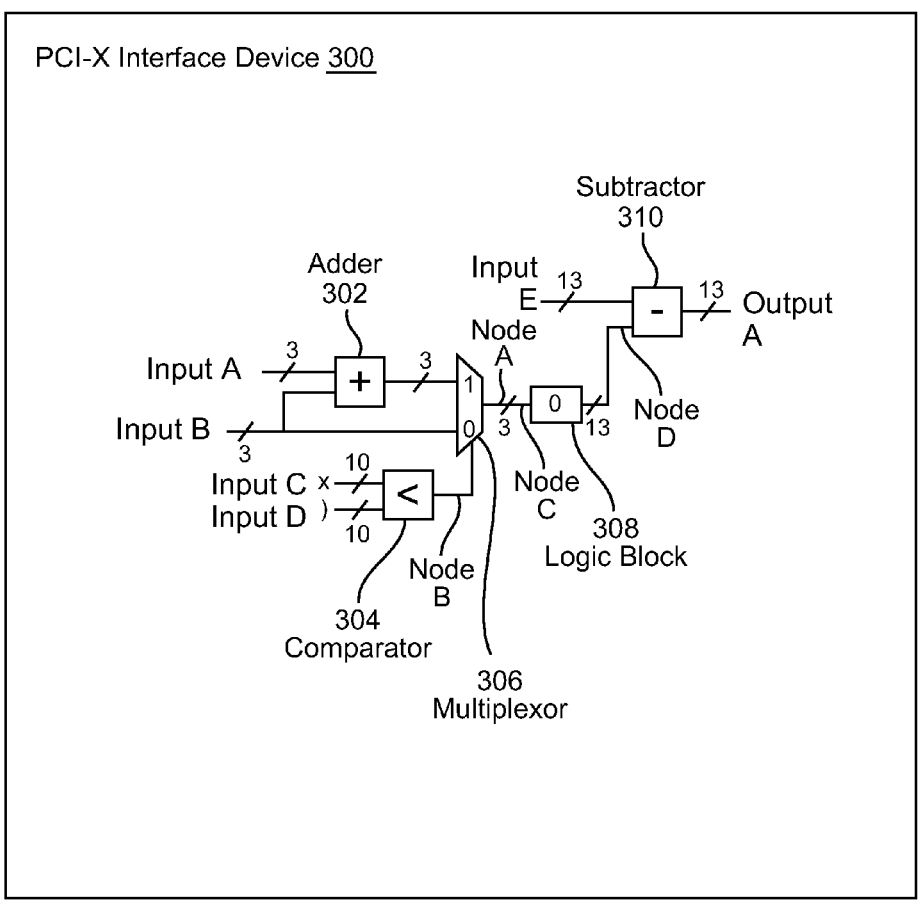
FIG. 3 is a schematic diagram of the logic components of a PCI-X device according to the present embodiment.

The PCI-X interface device is embodiment of the above approach and is described referring to FIG. 3. PCI-X Interface Device 300 comprises: adder 302; comparator 304; multiplexor 306; logic device 308; and subtractor 310.

Adder 302 comprises two 3 bit inputs A and B and a 3 bit output. The 3 bit output is input to logic device 306. Input A is a constant binary value of 100 (4 in decimal). Input B is the least 3 significant bits of the variable x (equivalent to x % 8) where x is the offset into the sector. Adder 302 adds 4 to the least significant bits of x (to give (x+4) % 8 as in equation 5).

Comparator 304 comprises two 10 bit inputs C and D and a binary output. The binary output (node B) is input to multiplexor 306. Input C is the offset into the sector variable x. Input D takes the constant binary value of 0001100000 (decimal 96). The result of the comparison (true or false, 1 or 0) is used as the select input to the multiplexor 306.

Multiplexor 306 takes input from adder 302, input B (3 least significant bits of offset x) and the true/false result of comparator 304. The output (node C) is input to logic device 308 and represents (x+4) % 8 if x is less than 96 and x % 8 if x is equal to or more than 96.

Logic device 308 takes a 3 bit input from logic device 306 (node C) and makes a 13 bit output to subtractor 310 (node D). Logic device 308 pads the input from node C with 10 binary zeros on the left.

Subtractor 310 takes a 13 bit constant input from input E (1000000000000 binary and 4096 decimal) and the padded output of logic device 308 (node D). The output is a modified read count at output A represents the result of the equation 7A when x<96 or equation 7B when x>=96.

Figure 4:
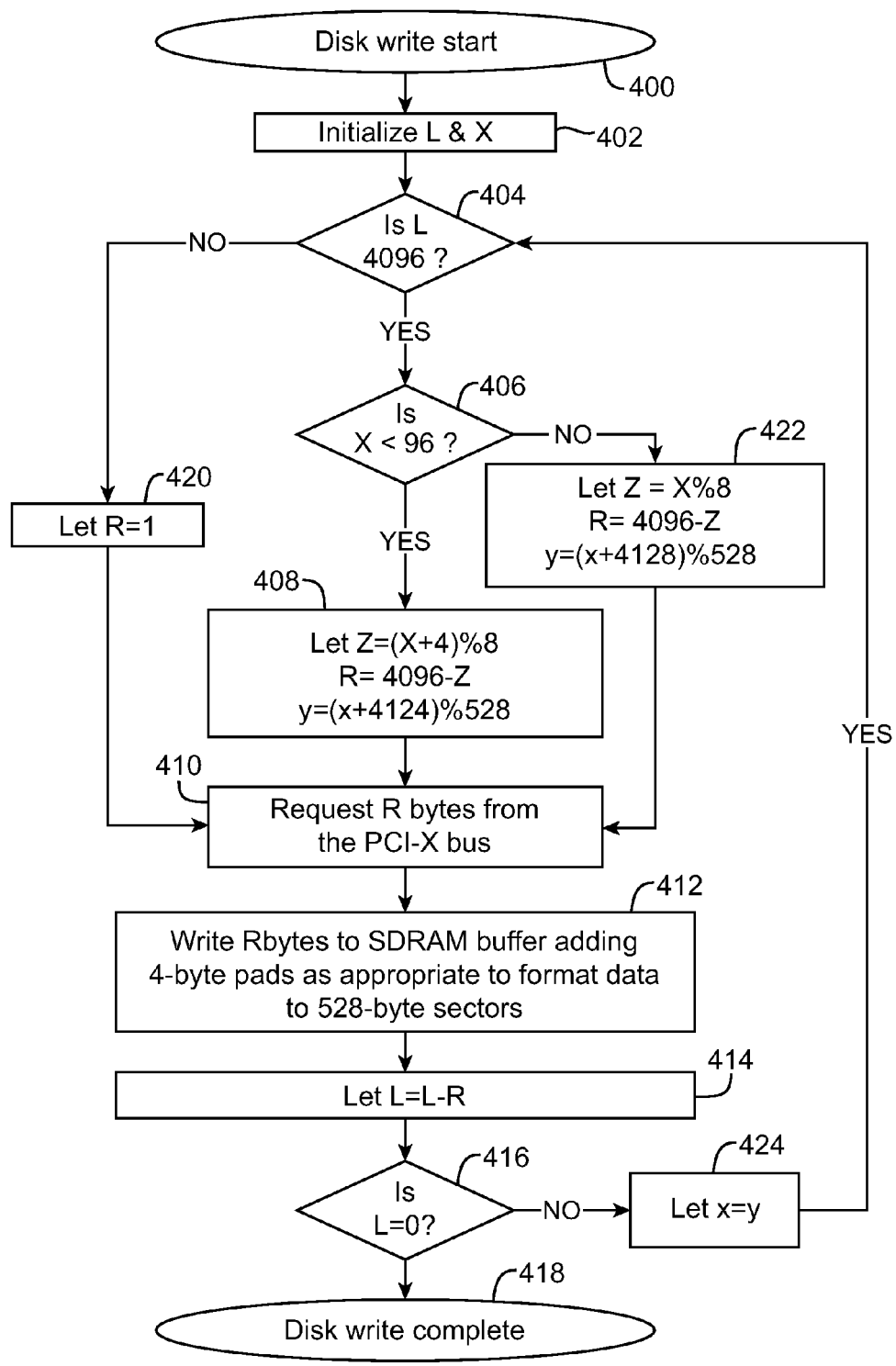
FIG. 4 is a flow diagram showing the operational steps of the preferred embodiment.

The method steps of the disk adapter card is described with reference to the flow diagram of FIG. 4.

Step 400 is the disk write start.

Step 402 initialises L & x where x is the byte offset from the beginning of a sector from which the SDRAM write will take place and L is the amount of data left to transfer from the PCI-X bus in a particular disk write operation.

Step 404 compares L with a constant value of 4096. If L is greater than 4096 then the next step is 406. If not then the next step is 420.

Step 406, since L is greater than 4096, x is compared with 96. If x is less than 96 then the next step is 408. If not then the next step is 422.

Step 408, since x is less than 96, the amount of bytes to be requested (R) is 4096−Z where Z=(x+4) % 8 and variable y, the said byte effect as (x+4124) % 528

Step 410. Request R bytes from the PCI-X bus

Step 412. Write R bytes to SDRAM buffer adding 4-byte pads as appropriate to format data in 528-byte sectors Step 414. Redefine L as L−R Step 416 compares L to zero. If L is zero then the next step is 418. Otherwise the next step is 424.

Step 418 is the end of the process where the disk write is complete

Step 420 is branched to from step 404 when L is not more than 4096. In this case R is set to L and the process moves to step 410 with no further adjustment of R.

Step 422 is branched to from step 406 when x is not less than 96. In this case R is 4096−Z again but this time Z=x % 8 and y is set to (x+4128) % 528 before the process continues at step 410.

Step 424 is branched to from step 416 if L is not zero, x is set to y and the process is returned to step 404.

Examples of memory organisation in SDRAM will now be further described with reference to FIGS. 5A, 5B, 6, 7A and 7B.

Figures 5A, 5B:
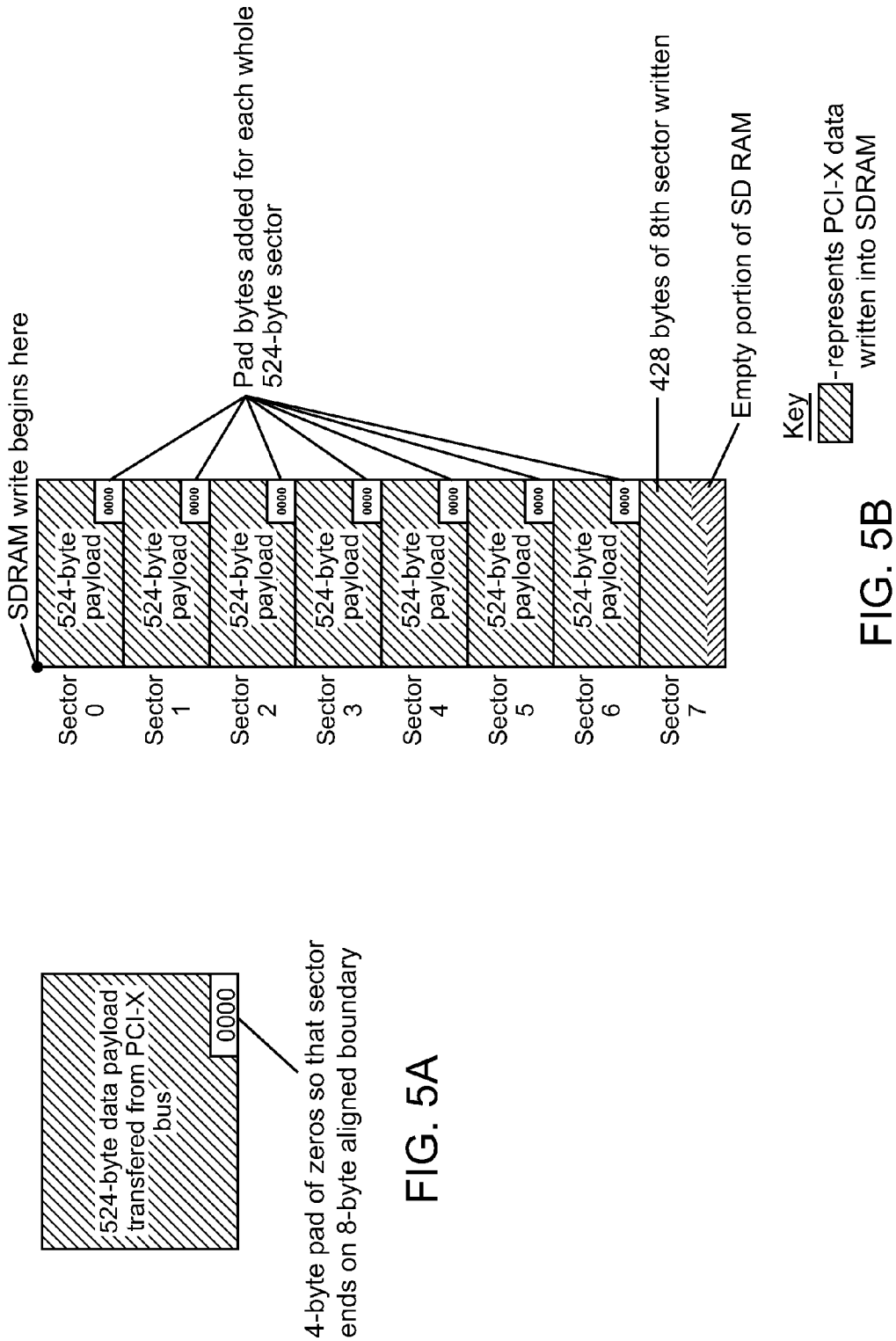
FIG. 5A is a schematic diagram of how sectors are stored & organised in SDRAM.
FIG. 5B is a schematic diagram of SDRAM Storage after 4096 bytes of PCI-X data have been written with padding.

Referring to FIG. 5A there is shown a schematic diagram of how sectors are stored & organised in SDRAM. A 4-byte pad of zeros is located at the end of the 528 byte 'sector' so that the sector ends on an 8-byte aligned boundary. Note that 'sector' here refers to a virtual sector which corresponds to a 524 byte sector on a disk but is actually a 528 byte area in SDRAM.

FIG. 5B is a schematic diagram of SDRAM storage after 4096 bytes of PCI-X data have been written with padding.

Figure 6:
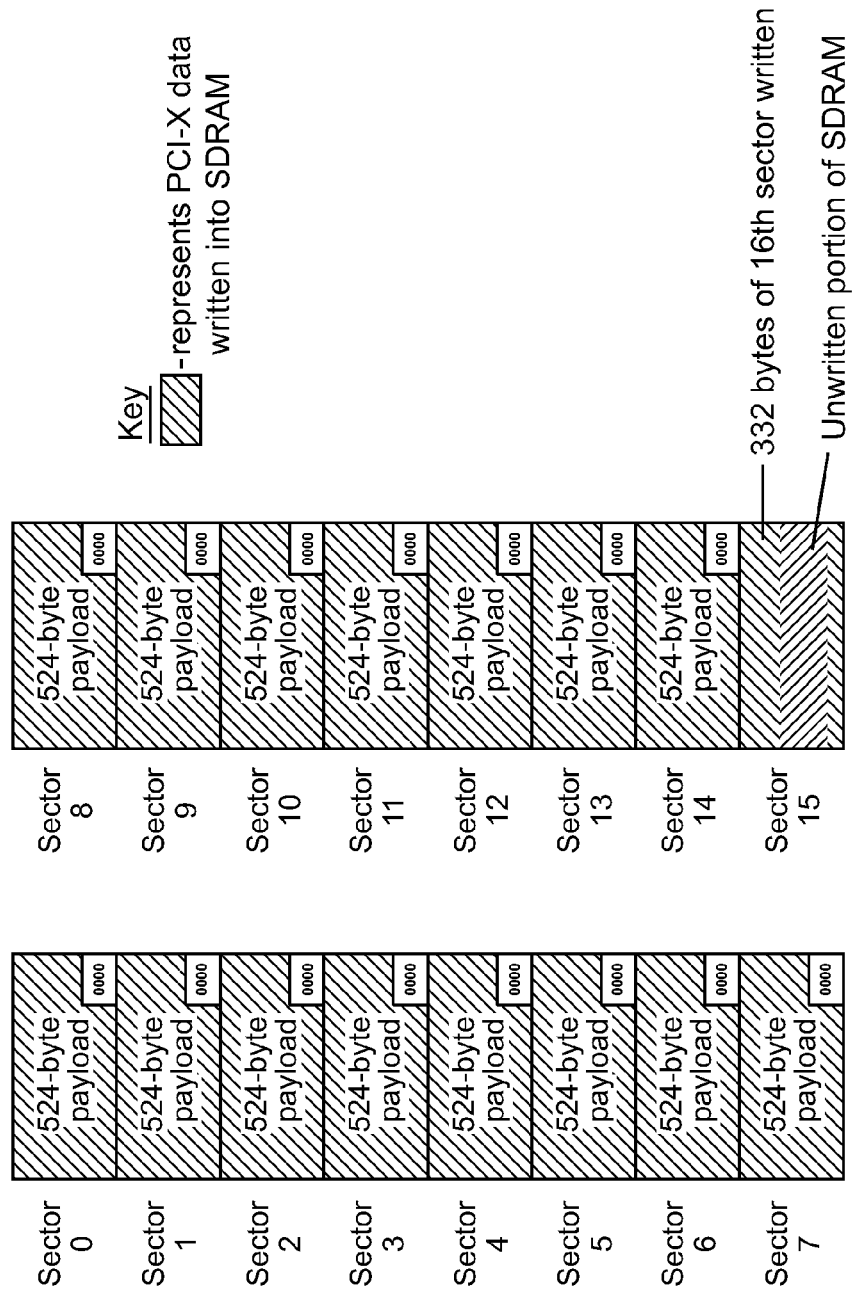
FIG. 6 is a schematic diagram of SDRAM storage after 2×4096 bytes of PCI-X data have been written with padding.

FIG. 6 is a schematic diagram of SDRAM storage after 2×4096 bytes of PCI-X data have been written with padding. The offset (x) is zero, 'sectors' 0 to 6 are full and 'sector' 7 has 428 bytes written (represented by left to right hashing). The last portion of 'sector' 7 is empty (represented by right to left hashing).

Figures 7A, 7B:
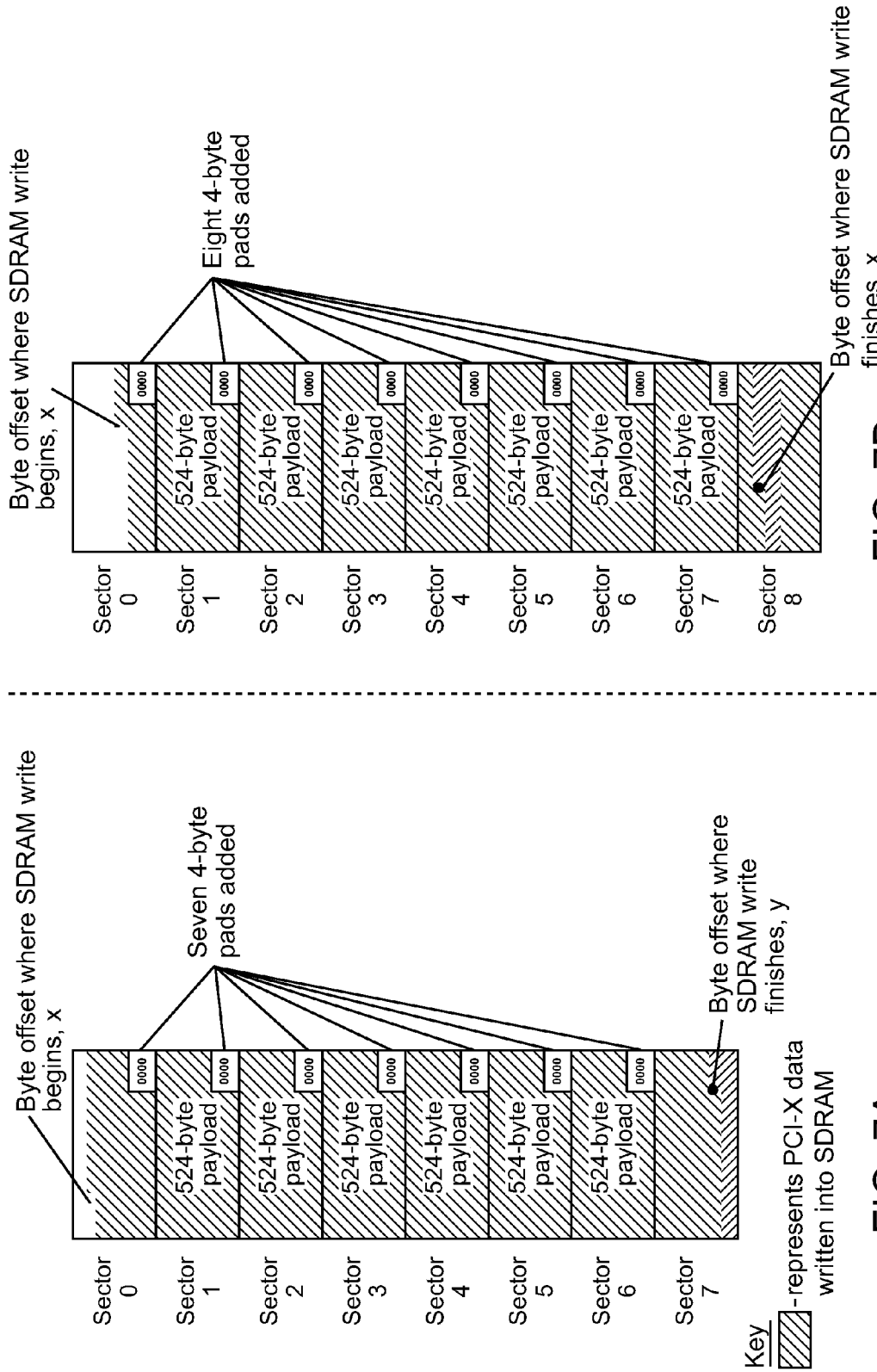
FIG. 7A is a schematic diagram showing the relationship of end byte, y to start byte offset, x when x<96.
FIG. 7B is a schematic diagram showing the relationship of end byte offset, y to start byte offset, x when x>=96.

FIG. 7A is a schematic diagram showing the relationship of end byte, y to start byte offset, x when x<96. The pay load is of size 4096 bytes. When the offset is less than 96 bytes then a total of seven 4 byte pads are added to each 'sector' but when the offset is equal to more than 96 bytes eight 4 byte pads are added one to each 'sector'. The embodiment of the preferred invention takes account of this difference. In this case equation 7A R=4096−x % 8 is used.

FIG. 7B is a schematic diagram showing the relationship of end byte offset, y to start byte offset, x when x>=96. When the offset is equal to or more than 96 bytes a total of eight 4 byte pads are added one to each 'sector'. In this case equation 7B R=4096−(x+4) % 8 is used.

What is claimed is:

1. A method of writing data to a disk, said method performing a write-modify-read for every partial 8 byte write, said method comprising:
    receiving a request for a sequence of L bytes;
    determining whether the last byte of the sequence of L bytes is the last byte of an 8 byte boundary in a sector of the disk;
    modifying, if the last byte of the sequence of L bytes is not the last byte of an 8 byte boundary in a sector of the disk, the number of bytes L by an amount of bytes that would allow the last byte of a reduced request to be the last byte of an 8 byte boundary in a sector of the disk, said modified number of bytes represented by M;
    requesting a sequence of M bytes;
    receiving the sequence of M bytes;
    writing the sequence of M bytes to one or more disk sectors with continuous write steps whereby the sequence of M bytes does not need a partial 8 byte write and there is no read-modify-write step.

2. A method as in claim 1 further comprising calculating an error correcting code for every 8 bytes written; and writing the sequence of M bytes including the error correcting code to one or more disk sectors in a single step with no read-modify-write step.

3. A method as in claim 1 further comprising taking into account an initial offset into a disk sector where the bytes are to be written.

4. A method as in claim 1 implemented in an adapter's PCI-X interface device.

5. A method as in claim 1 wherein the method comprises taking into account padding bytes at the end of each sector.

6. A method as in claim 1 wherein the sequence of M bytes is received into an intermediary buffer.

7. A system for writing data to a disk, said system performing a write-modify-read for every partial 8 byte write, said system comprising:
    means for receiving a request for a sequence of L bytes;
    means for determining whether the last byte of the sequence of L bytes is the last byte of an 8 byte boundary in a sector of the disk;
    means for modifying, if the last byte of the sequence of L bytes is not the last byte of an 8 byte boundary in a sector of the disk, the number of bytes L by an amount of bytes that would allow the last byte of a reduced request to be the last byte of an 8 byte boundary in a sector of the disk, said modified number of bytes represented by M;
    means for requesting a sequence of M bytes
    means for receiving the sequence of M bytes;
    means for writing the sequence of M bytes to one or more disk sectors with continuous write steps whereby the sequence of M bytes does not need a partial 8 byte write and there is no read-modify-write step.

8. A computer program product for processing one or more sets of data processing tasks, said computer program product comprising computer program instructions stored on a computer-readable storage medium for, when loaded into a computer and executed, causing a computer to carry out the steps of:
    receiving a request for a sequence of L bytes;
    determining whether the last byte of the sequence of L bytes is last byte of an 8 byte boundary in a sector of the disk;
    modifying, if the last byte of the sequence of L bytes is not the last byte of an 8 byte boundary in a sector of the disk, the number of bytes L by an amount of bytes that would allow the last byte of reduced request to be the last byte of an 8 byte boundary in a sector of the disk, said modified number of bytes represented by M;
requesting a sequence of M bytes;
receiving the sequence of M bytes;
writing the sequence of M bytes to one or more disk sectors with continuous write steps whereby the sequence of M bytes does not need a partial 8 byte write and there is no read-modify-write step.

* * * * *